United States Patent Office 3,157,281
Patented Nov. 17, 1964

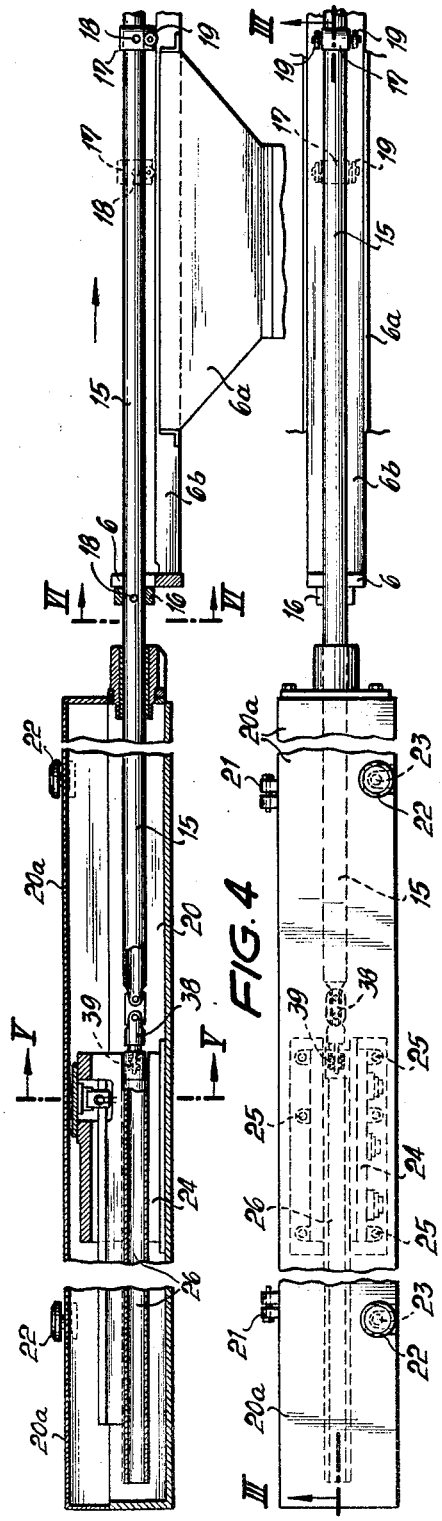

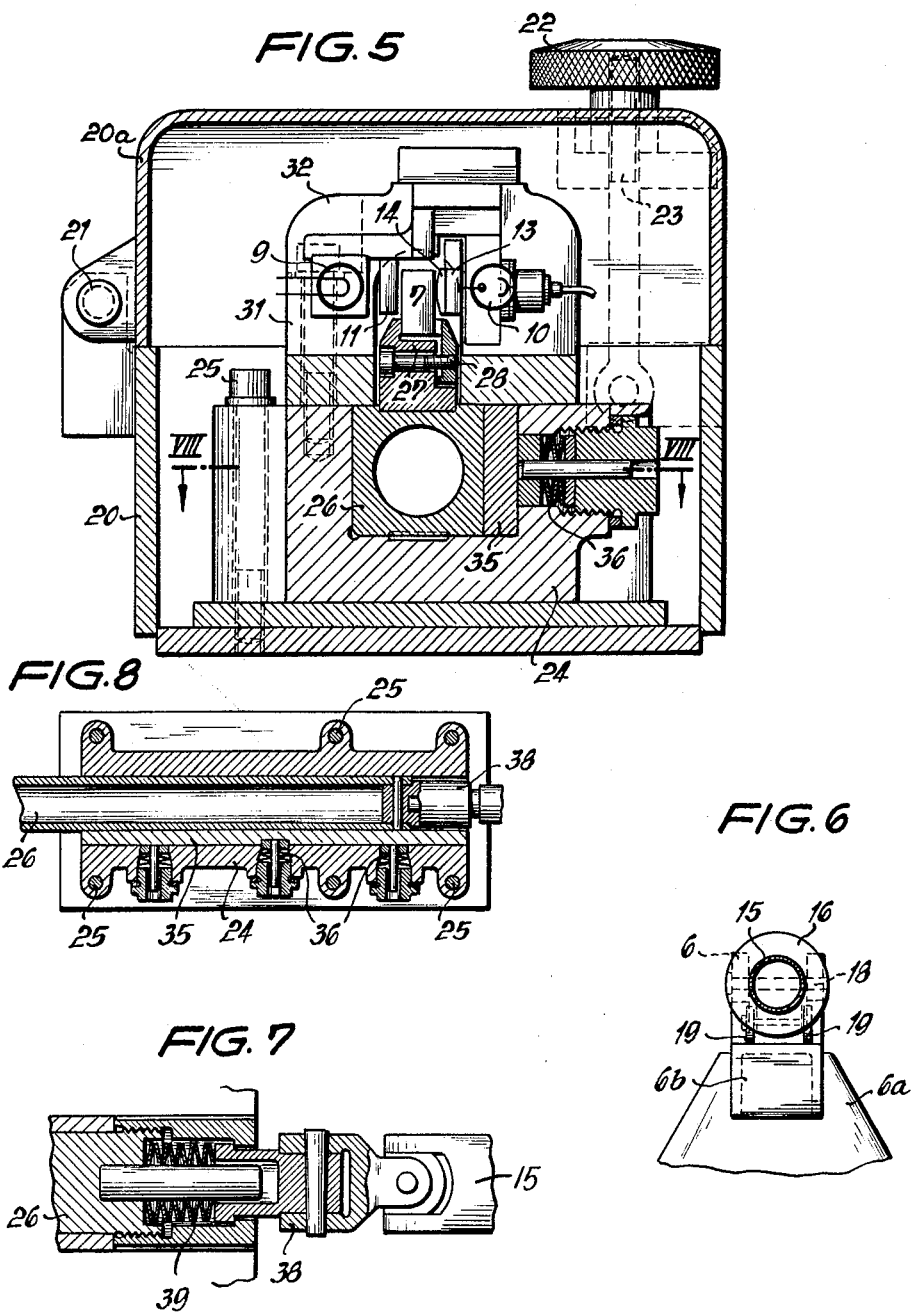

3,157,281
EXTRUSION PRESSES WITH MEANS FOR MEASURING AND REGULATING THE EXIT SPEED OF THE EXTRUDED PRODUCT
Wilhelm Schnetiker, Aachen, and Ralf Schneider, Dusseldorf-Ratingen, Germany, assignors to Schloemann Aktiengesellschaft, Dusseldorf, Germany
Filed Dec. 2, 1960, Ser. No. 73,413
Claims priority, application Germany, Dec. 21, 1959, Sch 27,161
4 Claims. (Cl. 207—1)

It is known that the speed of a press ram in metal rod and tube extrusion presses, during the extrusion operation, owing to differences in the resistance offered by the extrusion material to deformation during the extrusion stroke, varies in magnitude. In order to obtain a uniform texture and surface of the product, however, a definite speed of extrusion, adapted to the material to be extruded, should be maintained.

For the most part it is impossible to measure the delivery speed of the extruded product directly. The speed of the press ram has therefore been measured, and the speed of extrusion calculated from the product of the press-ram speed multiplied by the ratio of the cross-sectional area of the container to the cross-sectional area of the die aperture.

Presses are known, for example, in which a toothed rack is rigidly connected with the press ram. As the press ram moves, the rack slides over a contact spring, which alternately opens and closes the exciter circuit of a relay, whereby a condenser circuit is continually charged and discharged. Through the medium of a smoothing circuit a measuring instrument is connected, which shows a deflection corresponding to the speed of the press ram, as suggested in German Patent No. 653,967, issued December 8, 1937.

This known press has however serious disadvantages, since the rack cannot be divided finely enough, and no contact is a match for the stresses that occur. Moreover sufficiently accurate measurement results cannot be obtained at all press-ram speeds, since the inertia of the mechanical parts, particularly of the contact-maker, is too great. Finally the error of measurement occasioned by the unavoidable expansion of the standard during extrusion also enters into the result of measurement, that is to say, the result of the measurement is falsified because it includes the expansion and contraction of the press standard or of the tie-rods as the extrusion pressure increases and decreases.

The idea has been considered of connecting tachometer machines or similar rotating indicators to the press ram through rack and pinion. Such an appliance would however fail as soon as very small extrusion speeds had to be measured, since owing to the sticking and slipping effect in the material to be extruded, the press ram is exposed to heavy shocks. This sticking and slipping effect always occurs when material is sheared and a high pressure prevails perpendicularly to the direction of shearing. As has been measured, in presses with a low mean speed, stoppage and jumps, that is, brief extrusion speeds, alternate with one another. In the transition from the stoppage to the jump, very great accelerations occur. Rotating indicators or signal-emitters of all kinds require, for the conversion of linear motion into rotary motion, gears which upon connection to the press ram constitute oscillating structures, and would therefore falsify the measuring.

It is the object of this invention to provide a press the mean ram speed of which, during one unit of time, for instance during one second, can be measured independently of the high positive and negative accelerations occasioned by the sticking and slipping effect. Furthermore the result of measurement is not to be affected by oscillations of the ram, and moreover a great range of speeds, for instance from 0.5 mm. per second, must be able to be measured continuously, with a minimum accuracy of ±2%, referred to the minimum speed of 0.5 mm. per second. The existence of movements should preferably still be recognisable right down to a minimum speed of 1 mm. per minute.

The invention accordingly relates to a metal rod or tube extrusion press with means for measuring and regulating the speed of the extruded product by employing a linear indicator or signal-emitter. The invention consists in the feature that a very light indicator or signal emitter is employed, for instance an indicator which consists substantially of a diffraction-grating bar slidable in the extrusion direction and a photo-electric cell associated therewith, this indicator being arranged between the press ram and the stationary press cylinder. The invention further comprises, in conjunction with the photo-electric cell, a counter, which counts the impulses generated by the photo-electric cell in the unit of time, and indicates them with the aid of an indicating appliance. If the time $T=1$ or a decimal of 1 is set, the speed can be read off directly from the travel.

The linear emitter with a differential-grating bar and a photo-electric cell may alternatively be replaced by another very light linear emitter, such for example as a tone band and an inductor-syn. The emitter is arranged between the press ram, to which an abutment is secured, and the container, preferably in such a way that it is carried along only in the direction of motion of the press ram during the extrusion stroke, so that any oscillations of the press ram arising as a result of the sticking and slipping effect do not falsify the result of the measurement, since the individual rearward movements of the press ram are not transmitted to the measuring appliance. The casing of the indicator is rigidly connected with the press cylinder.

For the purpose of continuously regulating the speed of extrusion, there may moreover be connected in parallel with the indicating device a memory or storage device (counter), which forms the regulating deviation digitally, that is, as a numerical value, from the actual value and the desired value. If the change of length of the press ram upon alteration of the extrusion pressure is to be taken into consideration, there is arranged on the press cylinder a pressure gauge, for instance an auxiliary cylinder which measures the change of pressure in the working cylinder, and corrects the measurement of the speed of the press ram. This may for example be effected in such a way that on the piston rod of the auxiliary cylinder is arranged a signal-emitter or indicator, which, in the same manner as has already been described, consists of a diffraction-grating bar, a source of light, a condensing lens, a diffraction-grating plate and a photo-electric cell. The impulses generated by the indicator are then supplied, as a correction value, to the counter.

If the press ram bears through an abutment upon the diffraction-grating bar, which serves as an impulse-emitter, and is freely slidable in a horizontal direction, a possible falsification of the measurement result by inherent oscillations of the press ram is also obviated. The use of a diffraction-grating bar ensures a sufficiently accurate measurement even at low press-ram speeds, while on the other hand high speeds of the press ram can be continuously detected by employing a counter which practically does not limit the range of measurement in an upward direction. A further advantage is the obtaining of a direct numerical value for the particular press-ram speed, which can be read off directly on the indicating appliance. Furthermore this numerical value can be compared digitally (=numerically), as an actual value, with the desired value, and the difference value between the actual value and the desired value can be imparted, as a regulating deviation, to the regulating circuit of the press cylinder.

Finally, in the result of measurement, the unavoidable error caused by the change of length of the press ram in extrusion can also be compensated for, since the change of extrusion pressure is measured, and the change of length of the press ram corresponding to the change of extrusion pressure is taken into consideration as a digital correction factor of the measured press-ram speed in the regulating value for the speed of the press.

In the press according to the invention the speed of the press can be supervised by means of a numerical value indicated at intervals, which detects the press-ram speed over the entire working range within very narrow limits, and at the same time forms the regulating deviation as a comparison with the desired value.

The invention is illustrated by the accompanying drawings, in which:

FIGURE 3 shows a longitudinal section on the line III—III in FIGURE 4 through the displacing device of the diffraction-grating bar;

FIGURE 4 is a view plan of the device shown in FIGURE 3;

FIGURE 5 shows a cross section on the line V—V in FIGURE 3, on a larger scale;

FIGURE 6 shows a cross section on the line VI—VI in FIGURE 3 on a larger scale;

FIGURE 7 shows a part of FIGURE 3 on a larger scale; and

FIGURE 8 a section on the line VIII—VIII in FIGURE 5.

Figure 1:
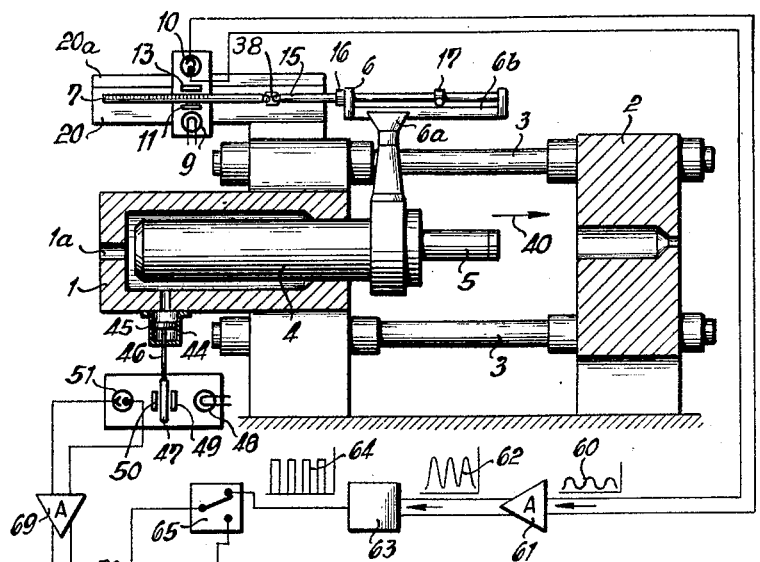
FIGURE 1 shows an extrusion press according to the invention in side elevation, the measuring device being represented diagrammatically and the said device being displaced by 90° from the position it actually occupies, which is shown in FIGURE 5.

According to FIGURE 1, a press cylinder 1 and a container 2 are connected by tie-rods 3. In the press cylinder 1 is guided a press piston 4, which is connected with the press ram 5.

A holding arm 6a is mounted on the press ram 5, and carries a ledge 6b, consisting of a channel bar, on the end face of which is arranged a forked abutment 6. The latter embraces a sliding tube 15, upon which setting rings 16 and 17 are secured, each with a split pin 18.

The setting ring 17 is of carriage-like construction, and it supports by way of rollers 19 the sliding tube 15 relatively to the web side of the ledge 6b. The sliding tube 15 is guided in a box-like casing 20, which is closed by a hinged lid 20a, shown in FIGURES 3 and 5. The lid 20a is rockably connected with the casing by means of hinges 21, and can be clamped to the casing 20 by way of milled-headed screws 22 and screw-threaded bolts 23. Upon the bottom of the casing 20 is secured, with screws 25, a block 24. In a recess in the block 24 is located a displaceable slide-piece 26, upon which is secured a holder, consisting of pairs of clamping jaws 27, which are adjustable relatively to one another by means of screws 28, for a diffraction-grating bar 7. Upon the block 24 is mounted a cover 32, which is held by screws 31, and in which a signal-emitter or indicator is inserted, consisting of a lamp 9, a condensing lens 11, a diffraction-grating plate 13, a slotted diaphragm 14 and a photoelectric cell 10.

Against the slide-piece 26 there bears laterally a ledge or bar 35, which is subjected to the pressure of springs 36, so as to exert a certain braking effect on the displacement of the slide-piece 26.

The slide-piece 26 is connected with the tube 15 by way of a forked coupling piece 38, as shown in FIGURE 7. The coupling piece 38 is cushioned against a compression spring 39 in the slide-piece 26, whereby shocks transmitted by the tube 15 to the coupling-piece 26 are damped.

The setting rings 16 and 17 are adjustable to the particular idle stroke of the press ram 5 for a short or long billet-container 2. The movement of the press ram 5 during extrusion is effected in the direction of the arrow 40 in FIGURE 3. During this movement, by way of the forked abutment 6, the tube 15, and at the same time the slide-piece 26, are moved along with the diffraction-grating bar 7, and an alternating voltage is thereby generated in the photo-electric cell 10. The abutment 6 first strikes against the setting ring 17 when the ram 5 is just entering the container 2. Only from this moment onwards is the diffraction-grating bar 7 moved forwards. The setting ring 16 serves for the return movement of the diffraction-grating bar 7 after the extrusion is completed. The distance between the setting rings 16 and 17 is therefore selected about as great as the idle stroke of the press ram from the retracted position to the commencement of extrusion. To the press cylinder 1 is secured a cylinder 44, the piston 45 of which is subjected on one side to the internal pressure of the cylinder 1, and on the other side of the pressure of a compressible fluid enclosed in the cylinder 44. The piston 45, by way of a piston rod 46, moves a second diffraction-grating bar 47, which, by means of a signal-emitter or indicator, consisting of a source of light 48, a condensing lens 49, a diffraction-grating plate 50 and a photo-electric cell 51, generates impulses correspondingly to the variation of pressure in the press cylinder 1.

The emitter 9, 11 (FIGURES 1 and 5) works as follows: The rays of light generated in the light source 9 are rendered parallel in the lens 11, which is at the distance of its focal length from the filament of the lamp 9. The parallel light rays then pass through the diffraction-grating bar 7, which is displaceable by the press ram 5, by way of the abutment 6, in the direction of motion 40 of the press ram, and afterwards through a stationarily arranged diffraction-grating plate 13 above it, and arrive as a luminous flux upon the photo-electric cell 10. During the displacement of the diffraction-grating bar 7 relative to the diffraction-grating plate 13, there arises a beam of light or luminous flux which alternates with the displacement in dependence upon the speed, and which the photo-electric cell 10 converts into a pulsating voltage. Upon the photoelectric cell 10 the light through numerous grating lines falls at the same time, as a result of which the luminous flux occurring in the photo-electric cell 10 becomes comparatively large, and on the other hand forms a mean value from a corresponding number of partial intervals. If for example upon the diffraction-grating bar 7, and also upon the diffraction-grating plate 13, 100 lines are ruled on 1 millimeter, and if the diffraction-grating plate 13 has a breadth of 10 mm., each impulse of the photoelectric cell 10 is formed as a mean value from 1000 partial intervals. The greatest luminous flux is taken up by the photo-electric cell 10 when the lines ruled in the diffraction-grating plate 13 and in the diffraction-grating bar 7 lie directly one behind another in the direction of the passage of light, and render possible an optimum passage of light. The minimum luminous flux falls in the photo-electric cell 10 when the lines ruled in the diffraction-grating bar 7 and in the diffraction grating plate 13 are so dislocated relatively to one another that the rule-free zone of the diffraction-grating bar 7 is covered by the lines ruled on the diffraction-grating plate 13, and conversely.

The second emitter represented in FIGURE 1, consisting of a diffraction-grating bar 47, a source of light 48, a condensing lens 49, a diffraction-grating plate 50 and a photo-electric cell 51, works in the same manner. The cell 51 measures the extent of the *change* of pressure in the cylinder 1. If the pressure in the cylinder remains constant for a time, then in this time no change is measured. In the counter 68 only the change from the open position to the closed position is reckoned. When the bar 47 and the plate 50 are stationary, it is immaterial whether they are in a fully open position, or in a partly open position, or in a completely closed position, for the number of changes is zero.

The apparatus that serves for measuring the speed of extrusion during the extrusion operation is diagrammatically illustrated in FIGURE 1. It consists of the indicator or signal-emitter 7, 9, 10, 11, 13 already described, which generates a pulsating voltage 60, which is amplified in an amplifier 61 to a pulsating voltage 62, and is converted, in an impulse-former, a so-called Schmitt trigger 63, into rectangular impulses 64. These rectangular impulses are supplied, by way of a gate 65, to a counter 68. Moreover the counter 68 also receives, from the second indicator or signal-emitter, consisting of the diffraction-grating bar 47, the source of light 48, the condensing lens 49, the diffraction-grating plate 50 and the photo-electric cell 51, further impulses, which, according to their sign, are added to or subtracted from the rectangular impulses 64 that pass through the gate 65 into the counter or integrating apparatus 68. The impulses generated by the second indicator are likewise amplified, in an amplifier 69, and converted, by way of a Schmitt trigger 70, into rectangular impulses, before being conveyed to the counter 68. The impulses counted in one unit of time, for instance in one second, in the counter 68, are supplied, after the expiration of the unit of time, to a storage or memory 72, and given (when amplified by way of an amplifier 73) to a luminous-dial indicator 74, where the number of impulses appears as a numerical value, and is a measure of the speed of the ram 5 during the unit of time of the measurement. After, impulses have been delivered for the period of one unit of time into the counter 68, the gate 65 receives from a reducer 76, and in particular from the reducer stage with a frequency of 1 cycle per second, an impulse which opens the gate 65, and thus interrupts the arrival of further impulses from the impulse-former 63 (Schmitt trigger) to the counter 68 (for $10^{-4}$ sec.). The frequency-reducer 76 consists of a number of stages of frequency ranging from $f=2^{13}$ cycles to $f=1$ cycle (frequency), which reduce the frequency obtained from a quartz oscillator 77 each time to half that of the preceding stage. In the constructional example the quartz oscillator 77 has a frequency of 8.192 kilocycles per second, which it supplies to the first reducer stage $f=2^{13}$ of the reducer 76, and which is reduced, in the frequency-reducer 76, to a frequency of 1 cycle per second. Simultaneously with the impulse from the reducer stage with the frequency of 1 cycle per second, the memory 72 receives at the gate 65 an impulse which expunges the preceding number from the memory 72.

In a very short distance the memory 72 receives a further impulse from the reducer stage that effects the feeding of the number from the counter 68 into the memory 72, that is, that initiates the filling of the memory. Immediately thereafter, by a further impulse, the number in the counter 68 is expunged, so that the latter is ready for the counting of a further sequence of impulses. Again by an impulse from the reducer stage 76 the gate 65 receives a further impulse, which closes the connection between the Schmitt trigger 63 and the counter 68, so that the impulses generated can again run into the counter 68. After the rectangular impulses 64 have again run into the counter 68 during the continuance of one unit of time, the gate 65, by an impulse from the reducer 76, as already described, is opened. The same cycle of operations is then repeated. The numers meanwhile passing into the memory 72 from the preceding numerical value are amplified by an amplifier 73, and represented as numerical values in the luminous-dial indicator 74. It is thus possible to read off directly the extrusion speeds measured during the past unit of time.

By means of the piston 45 guided in the auxiliary cylinder 44, there is imparted to the counter 68, by way of the diffraction-grating bar 47 and the indicator or signal-emitter 48, 49, 50, 51, a correction factor in the form of positive or negative impulses, and by way of the amplifier 69 and the Schmitt trigger 70, which takes into consideration the lengthening or shortening of the press ram 5 during the extrusion operation, in the measurement of speed. A shortening of the press ram in extrusion occurs simultaneously with a transient rise of pressure in the press cylinder 1, which results in a displacement of the auxiliary piston 45, and therefore of the diffraction-grating bar 47. Upon an increase in the length of the press ram 5, an opposite displacement of the diffraction-grating bar 47 is effected. According as the impulse sequence thereby produced has a positive or a negative sign, it is added or subtracted, in the counter 68, to or from the number of impulses of the indicator or signal-emitter 7, 9, 10, 11, 13 counted in the unit of time (for instance 1 second), since without this correction the measured value for the speed of extrusion would be falsified.

The regulating of the speed of extrusion can be effected by hand according to the actual value given by the illuminated-dial indicator 74.

The actual value may however alternatively form, by comparison with a desired value, a regulating value, which is supplied to the press-control, that is to say, to the valves, not shown, which control the admission of the pressure liquid to the port 1a of the cylinder 1. This is possible for instance by continuously comparing the impulses proceeding from the Schmitt trigger 63 to the counter 68, as regards their frequency, with a desired value, which is given by the quartz oscillator 77 or by the frequency-reducer 76 associated therewith. From the actual and desired values, in a counter 78 counting forwards and backwards, is formed the regulating value, which continuously corrects the press control.

Figure 2:
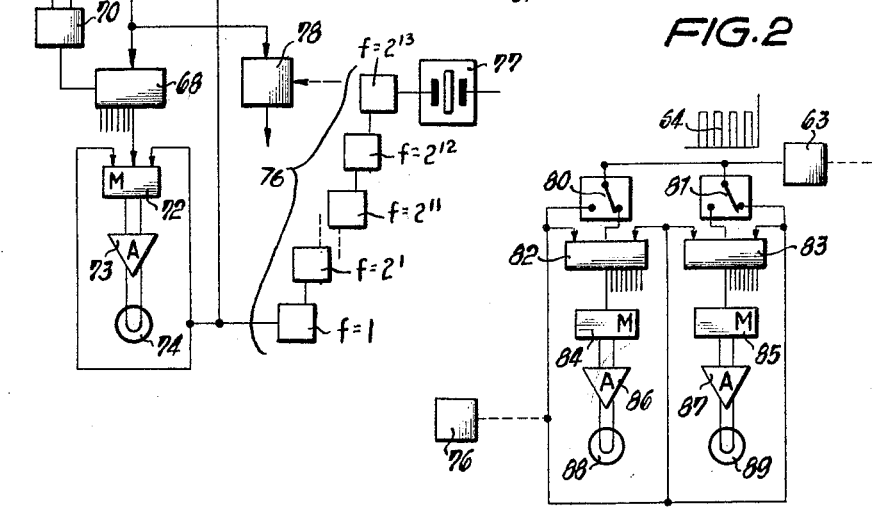
FIGURE 2 shows an alternative construction of part of the measuring device according to FIGURE 1.

It is also possible, in place of the gate 65 which interrupts the flow of impulses to the counter 68, to arrange, as FIGURE 2 shows, from the Schmitt trigger 63, two gates 80 and 81 in parallel with one another, there being associated with each gate 80, 81 a counter 82, 83, a storage (memory 84 85), an amplifier 86, 87 and an illuminated-dial indicator 88, 89. The gates 80, 81 are for example alternately, after one second, opened, and the other at the same time closed, so that in turn, every second, either through one gate 80 or through the other gate 81, the counters 82 or 83 associated therewith receive a sequence of impulses which corresponds to the current speed of extrusion, and can be read off as a numerical value in the indicating device 88 or 89 subordinated each counter 82 or 83.

For a further disclosure of the structure and operation of the measuring and indicating system, reference is made to the Beman et al. U.S. Patent No. 2,685,082, dated July 27, 1954.

What we claim is:

1. A method of measuring and indicating the output speed of the extruded product of a hydraulic metal-extrusion press, comprising the steps of: measuring the forward feeding movement of the press ram by means of a linear signal-emitter, measuring the hydraulic pressure in the extrusion cylinder of the press by means of a second linear signal-emitter, converting the signals from said emitters to separate rectangular digital pulses, counting the separate digital pulses emitted per unit of time, comparing the two separate numbers of digital pulses emitted per unit of time in an electronic computer, and digitally indicating the resultant value upon an indicating device.

2. A metal extrusion press including a press ram, a stationary press cylinder, means for measuring and indicating the exit speed of the extruded product and means for measuring hydraulic pressure charges in said cylinder, said speed measuring and indicating means comprising a diffraction-grating bar connected to said ram for movement therewith to provide a linear indicator of relatively small mass, a photo-electric cell operatively associated with said bar to provide a pulsating voltage, a converter connected to said cell to convert said pulsating voltage to rectangular digital pulses and a counter connected to said converter for counting said digital pulses per unit of time, said pressure measuring means comprising a pressure responsive device connected to said cylinder and having an element movable in response to changes in pressure in said cylinder, a diffraction-grating bar connected to said element, a second photo-electric cell operatively associated with said last-named bar to provide a positive or negative pulse, a second converter connected to said second cell to convert said positive or negative pulse to a positive or negative rectangular digital pulse, said second converter being connected to said counter whereby said positive or negative pulses are added to or substracted from the pulses received from said first converter and a visual indicator connected to said counter for providing a numerical indication of the output of said counter.

3. A metal extrusion press including a press ram, a stationary press cylinder and means for measuring and indicating the exit speed of the extruded product, said speed measuring and indicating means comprising a slidably mounted diffraction-grating bar, an elongated member, means including a spring connecting said elongated member and said bar for movement therewith, spaced abutments on said elongated member, the distance between said abutments corresponding approximately to the length of travel of said ram between a retracted position and a position at the start of the extrusion stroke, a member fixed to said ram between said abutments for engaging said abutments to move said elongated member and bar upon movement of said ram, said bar serving to provide a linear indicator of relatively small mass, a photo-electric cell fixed with respect to said cylinder, a diffraction-grating plate fixed with respect to said cylinder and disposed between said bar and said cell, said cell being operatively associated with said bar to provide a pulsating voltage, a converter connected to said cell to convert said pulsating voltage to rectangular digital pulses, a counter connected to said converter for counting said digital pulses per unit of time and a visual indicator connected to said counter for providing a numerical indication of the output of said counter.

4. A metal extrusion press including a press ram, a stationary press cylinder and means for measuring the actual speed of advance of said ram and comparing said actual speed with a predetermined desired speed to provide a numerical indication for use in regulating the press to provide the desired speed, said means comprising a pulsating voltage signal emitter, said emitter including a part fixed to said ram for movement therewith, a stationary part operatively associated with said movable part, a converter connected to said emitter to convert said pulsating voltage to rectangular digital pulses corresponding to the actual speed of advance of said ram, means for providing pulses corresponding to a predetermined desired speed, means for comparing said actual speed pulses and said desired speed pulses and a visual indicator connected to said comparing means to provide a numerical indication for use in regulating said press to provide the desired ram speed.

References Cited in the file of this patent

UNITED STATES PATENTS

| | | |
|---|---|---|
| 2,018,217 | McNamee | Oct. 22, 1935 |
| 2,113,208 | Andrews et al. | Apr. 5, 1938 |
| 2,628,539 | De Neergaard | Feb. 17, 1953 |
| 2,685,082 | Beman et al. | July 27, 1954 |
| 2,710,934 | Senn | June 14, 1955 |
| 2,785,353 | Fenemore | Mar. 12, 1957 |
| 2,882,475 | De Neergaard | Apr. 14, 1959 |
| 2,907,937 | Apgar et al. | Oct. 6, 1959 |
| 2,917,693 | Cail | Dec. 15, 1959 |
| 2,968,144 | Royle et al. | Jan. 17, 1961 |
| 3,062,995 | Raymond et al. | Nov. 6, 1962 |

FOREIGN PATENTS

| | | |
|---|---|---|
| 653,967 | Germany | Dec. 7, 1937 |